United States Patent
Care

(10) Patent No.: US 8,260,093 B2
(45) Date of Patent: Sep. 4, 2012

(54) COMPONENT MONITORING ARRANGEMENT

(75) Inventor: Ian C. D. Care, Derby (GB)

(73) Assignee: Rolls-Royce, PLC, London (GB)

( * ) Notice: Subject to any disclaimer, the term of this patent is extended or adjusted under 35 U.S.C. 154(b) by 55 days.

(21) Appl. No.: 12/738,688

(22) PCT Filed: Nov. 10, 2008

(86) PCT No.: PCT/GB2008/003790
§ 371 (c)(1),
(2), (4) Date: Apr. 19, 2010

(87) PCT Pub. No.: WO2009/063181
PCT Pub. Date: May 22, 2009

(65) Prior Publication Data
US 2010/0278476 A1 Nov. 4, 2010

(30) Foreign Application Priority Data
Nov. 14, 2007 (GB) .................................. 0722319.1

(51) Int. Cl.
*G02B 6/00* (2006.01)
*G01J 1/04* (2006.01)
*G01B 5/28* (2006.01)

(52) U.S. Cl. ............ 385/13; 385/4; 385/5; 385/8; 385/9; 385/10; 385/11; 385/12; 250/227.11; 250/227.13; 250/227.14; 250/227.15; 250/227.16; 250/227.17; 250/227.18; 702/34; 702/35

(58) Field of Classification Search .................. 385/4–5, 385/8–13; 250/227.121–227.18; 702/34–35
See application file for complete search history.

(56) References Cited

U.S. PATENT DOCUMENTS

| | | | |
|---|---|---|---|
| 4,280,185 A * | 7/1981 | Martin | 701/99 |
| 4,756,194 A | 7/1988 | Grandpierre et al. | |
| 4,930,852 A * | 6/1990 | Wheeler et al. | 359/315 |
| 6,204,920 B1 * | 3/2001 | Ellerbrock et al. | 356/477 |
| 6,420,696 B1 * | 7/2002 | Bennett et al. | 250/227.14 |
| 7,860,664 B2 * | 12/2010 | Loomis et al. | 702/35 |
| 2001/0054682 A1 | 12/2001 | Bennett et al. | |

(Continued)

FOREIGN PATENT DOCUMENTS

EP 0 252 228 A2 1/1998

(Continued)

OTHER PUBLICATIONS

Mar. 3, 2009 International Search Report issued in PCT/GB2008/003790.

(Continued)

*Primary Examiner* — Brian M. Healy
*Assistant Examiner* — Guy Anderson
(74) *Attorney, Agent, or Firm* — Oliff & Berridge, PLC

(57) ABSTRACT

Fibre substrates act as a conduit for light along which response signals are transmitted to a controller in the form of an electronic device associated with a component. The processed signals are stored in a local memory to provide a component history and a prediction of future performance and life. Service and repair history may be added to the component device memory to enable a complete history to be stored with the component. A controller may transmit data to an external controller or display through typically a wireless connection. Power to the component electronics may be provided by an induction loop or transformer.

14 Claims, 3 Drawing Sheets

U.S. PATENT DOCUMENTS

| | | | |
|---|---|---|---|
| 2005/0110277 A1 | 5/2005 | Adamson et al. | |
| 2006/0154398 A1* | 7/2006 | Qing et al. | 438/48 |
| 2006/0239603 A1* | 10/2006 | Patel et al. | 385/12 |
| 2007/0116402 A1* | 5/2007 | Slade et al. | 385/12 |
| 2008/0013879 A1* | 1/2008 | Mossman | 385/13 |
| 2008/0128600 A1* | 6/2008 | Ogisu et al. | 250/227.18 |

FOREIGN PATENT DOCUMENTS

| | | |
|---|---|---|
| EP | 1 089 239 A2 | 4/2001 |
| FR | 2 865 539 A1 | 7/2005 |
| GB | 2 168 806 A | 6/1986 |
| GB | 2 387 912 A | 10/2003 |
| WO | WO 93/25866 A1 | 12/1993 |
| WO | WO 00/50849 A1 | 8/2000 |
| WO | WO 2005/031501 A2 | 4/2005 |

OTHER PUBLICATIONS

Mar. 3, 2009 Written Opinion issued in PCT/GB2008/003790.
Feb. 29, 2008 Search Report issued in British Patent Application No. GB0722319.1.

* cited by examiner

COMPONENT MONITORING ARRANGEMENT

The present invention relates to component monitoring arrangements and more particularly to situations utilising with respect to components incorporating other elements to provide reinforcement.

It is known to provide components which comprise a base matrix such as a resin within which fibres or other elements are provided in order to achieve reinforcement. Such composite structures have particular advantages in terms of weight and specific design optimisation to achieve operational performance. Unfortunately such complex structures when formed into components can be difficult to monitor during initial fabrication stages as well as during operational use. In such circumstances with regard to use of such components in operationally critical situations such as regard to aircraft engines or other components difficulties can arise in achieving or guaranteeing component life expectancy. Furthermore, batch testing of components as they are fabricated may require scrapping of an entire batch of components when some of the components may be acceptable or the batch production process may be altered if a particular problem is identified early enough. Furthermore, selective batch testing may necessitate destruction of the tested component with obvious cost implications.

Prior techniques used in regard to determining structural integrity of structures, particularly during thermal resin curing processes associated with composite component formation, having included X-ray CT, ultrasonic and rheology. X-ray CT, although relatively slow, can detect voids, inclusions, fibre position/alignment, and delamination. It is not good at determining resin cure and resin property changes. With respect to ultrasonic inspection, sound waves are reflected by defects, inclusions and surface boundaries and the speed of acoustic wave changes with changes of viscosity of the resin as it cures as well as with respect to temperature variations during that curing process. Cracking in the course of delamination produces sounds (acoustic emissions) which can also be detected during curing and fabrication as well as potentially during operational use of the component. Rheology techniques are inherently destructive and rely on twisting parallel produced samples tested over a controlled time period during the curing stages with respect to composite component formation. Such rheology techniques depend upon consistency between samples and production parts especially in terms of scale features, that is to say volumetric sizes of the component.

It will be appreciated that with regard to components it is desirable to be able to monitor that component's performance during fabrication as well as during operational use. Nevertheless, it will also be understood that in order to be practical such monitoring arrangements must only have minimum effect on component weight and complexity. In such circumstances generally it is preferred that monitoring arrangements are self contained. In order to enable monitoring over the whole life cycle, that is to say fabrication (curing) as well as operational stages, it will also be understood that such monitoring must be able to withstand fabrication and environmental variations encountered by the component.

In view of the above, prior components have typically focused upon only one stage of fabrication or operational status rather than providing monitoring throughout a component's life cycle. It will be appreciated a whole life cycle monitoring arrangement needs to consider several problems including as follows:

(a) Positioning of composite fibres during initial lay up within a mould which requires determination both of position and alignment of those fibres.

(b) Detecting damage during moulding with regard to fibres.

(c) Monitoring matrix resins and otherwise during curing and other stages of fabrication of the component in view of changes in environmental conditions and also with regard to ensuring that inclusions or trapped gas or voids or pockets are not created within the presented matrix. Furthermore, it will be appreciated that some curing processes are exothermic and therefore there is a potential danger that fibres or the resin incorporated within a composite structure may be damaged. Monitoring curing temperatures to avoid delamination or otherwise is advantageous.

(d) Monitoring fibre structure whilst within the cured product but subject to other processing such as surface finishing and final component testing.

(e) During component operational life time it is expected that the component will generally be impacted either significantly or insignificantly and such impacts monitored. Such impacts may not result in surface visible defects but nevertheless internally and through substrate fatigue may create a significant defect over time.

(f) Necessary detection in non visible or barely visible damage in determination of the extent of such damage in order to achieve a predictive useful life for the component to enable and plan maintenance and repair would be advantageous.

(g) Monitoring differential movement of parts of the component during manufacture and operational life would be beneficial. It will be understood that a component may be of varying thickness as a result of changes in curing times, temperatures and shrinkage rates.

In view of the above as indicated it is advantageous to provide ongoing monitoring of components but prior arrangements are limited and tend to be life cycle stage specific. It is also known to provide monitoring during an operational life but such monitoring tends to be reactive rather than responsive. U.S. Pat. No. 3,910,105 describes use of optical fibres as light pipes such that if a component structure is overly stressed these optical fibres will fracture and fragment such that the light pipe action is interrupted and so determination can be made that the component has exceeded acceptable tolerance limits and therefore should be replaced.

In accordance with aspects of the present invention there is provided a component monitoring arrangement, a component, an assembly of components and a method of monitoring a component as set out in the independent claims.

Aspects of the present invention will now be described by way of example and with reference to the accompanying drawings in which.

Figure 1:
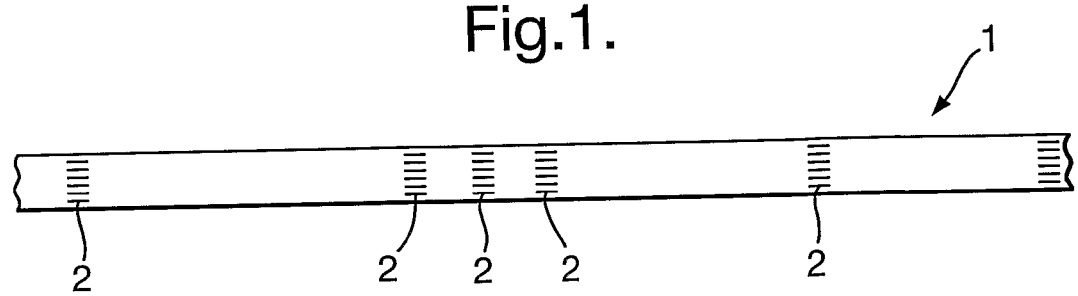
FIG. 1 is a schematic side view of a fibre substrate use in accordance to aspects of the present invention in order to provide component monitoring.

As indicated above, aspects of the present invention relate particularly to components which incorporate fibres for reinforcement. In such circumstances composite structures can be created which incorporate fibres for reinforcement as well as a matrix within which those fibres are located to provide a desired operational strength and structural integrity for the component. The matrix most typically is a resin or other material within which the fibres are located but it will also be understood that fibres may be incorporated within metals subject to suitable materials being found for bonding over typical temperature ranges for forming metal components through casting, sintering or other processes. Typically, prior systems have been able to monitor component performance at single stages of a components lifecycle such as at fabrication or during periods of operational cycling. It would be advantageous particularly with regard to composite structures to form components in which monitoring of the component over all stages of a component life is possible. Thus, a memory which is integral with the component can store a component history of response signals over a time period and/or manufacturing stage. The component history can be used to predict possible component life as a result of manufacturing or in service incidents. As indicated above, these stages include initial presentation of the fibres within the matrix prior to curing, the various curing stages and ongoing operational component life in terms of stresses as a result of cyclic operations as well as impacts inherent with some components operational lives.

As indicated, aspects of the present invention relate to components which at least incorporate fibres for reinforcement. In accordance with aspects of the present invention at least some of these fibres are utilised as a fibre substrate upon which sensor elements can be located for orientation and configuration in order to provide indicators as to environmental variations incident to the component. It is known that composite structures to form the component may be homogeneous in terms of fibre element type or incorporate a variety of fibres in order achieve the desired reinforcement. In such circumstances fibre substrates utilised to present sensor elements in accordance with aspects of the present invention may similarly have different thicknesses, different material types and be linked or distributed in particular patterns within the component. The fibre substrate may be incorporated as an over-lay, braiding, weaving, knitting, stitching or other association with the component. Typically, as indicated, fibre substrates in accordance with aspects of the present invention will be associated with reinforcing fibres of the component structure. In such circumstances the fibre substrate and reinforcing fibres of the present application may be grouped or bundled such that the substrate fibre itself can more deliberately be located within the component structure to provide indications with regard to component structure response to environmental conditions as well as the fibre group or bundle response to those environmental conditions. It will be appreciated that the fibre substrate itself is supported upon the main reinforcing fibres to achieve consistency of position for referencing with regard to sensor element operation. The fibre substrate in such circumstances can be presented as a ribbon or an insert within a tube or adhered to a backing reinforcing fibre bundle to present the sensor element located upon the fibre substrate. Furthermore, bundles of reinforcing fibre may be linked together or linked to other fibres in order to create a desired "chassis" within the composite structure for presentation of the fibre substrate on which the sensor element is located. Generally it can be considered the reinforcing fibres and associated fibre substrates for sensor elements, in accordance with aspects of the present invention, may be woven or otherwise formed in order to create a desired structure which is embedded in a resin or other material in order to create the composite component. An adjacent tracer fibre to a sensor can be used to ensure correct location of the sensor fibre, or a tracer coating applied to the sensor fibre to make the sensor fibre opaque to x-rays to determine location. The woven or other structure created by the reinforcing fibres, as well as the fibre substrate, can achieve a three-dimensional perspective which is then joined with a filler material or matrix such as a resin to create a solid light structure rather than a pure fabric. Such structures, and the underlying reinforcement provided by the reinforcing fibres and now fibre substrates, provide the benefits of composite component structures in terms of performance for weight in such situations as aircraft engines or other components.

It will be appreciated that the reinforcing fibres and the fibre substrates can be formed into a number of patterns with fibres within each pattern provided to achieve its component advantage such as textile strength or stiffness as required within the component as formed. The fibres provide reinforcement as well as the fibres utilised to provide the fibre substrate may be of similar materials or differential materials dependent on requirements. It will be understood that accentuated dimensional variation in the fibres from which the fibre substrate is formed may be beneficial in improving response of presented sensor elements by enhancing variations in environment conditions. Typically dimensional stability is advantageous with regard to the reinforcing fibres. In such circumstances it may be different fibres are provided for aspects of the present invention in terms of presenting and orientating a sensor element in comparison with those required for reinforcement. These fibres may be shape memory fibres provided by a metallic or plastic or other suitable material. In such circumstances these shape memory aspects of the fibre again will be utilised with regard to a fibre substrate for presenting a sensor element in order to provide a shape memory reference range for the sensor element utilised in order to provide a response indicative of environmental conditions or particular variations in environmental conditions.

Normally the reinforcing structure will be predominantly made up of one particular fibre such as glass fibre or glass fibre reinforced plastics or carbon fibre, however other fibres and metal wires in accordance with aspects of the present invention can be added either as an interweave or an overlay, braid or section within a reinforcing structure for a composite material. These fibres may be thermo-plastics, Nylon, Kevlar, Aramid or metallic wires as indicated in order to provide reinforcement. In accordance with aspects of the present invention each fibre substrate acts as a chassis upon which sensor elements can be presented and orientated.

These composite materials may be part of another structure that surrounds or extends within the composite. This may include protective cladding layers or other "sandwich" arrangements.

Monitoring of component structures through fabrication and operational cycles in the component lifecycle is important in order to achieve reliable and consistent product production and provide predictability with regard to life expectancy during normal use and subsequent to unusual events such as impacts upon the component. Generally monitoring arrangements should either be non-intrusive or an integral part of the component structure such that on-going monitoring can be achieved without limiting or destroying the component itself.

Aspects of the present invention as indicated relate to provision of a fibre substrate in order to present the sensor element. In such circumstances, the fibre substrate itself needs to be appropriately presented within the component structure. Reinforcing fibres, and therefore fibre substrates, in accordance with the present invention may be laid into a mould for forming a composite structure as described above. The fibres generally require alignment and provision to retain position within the mould during application. Positioning of the reinforcing fibres and therefore fibre substrate in accordance with aspects of the present invention can be achieved by interweaving the fibres such that a generally consistent weave of fibres is achieved with retention of position through the interweave of those fibres.

Aspects of the present invention allow provision of substrate fibres to present sensor elements which are alongside or interwoven with each other such that the reinforcing fibres and/or appropriate surface areas of the component area can be monitored by the sensor elements presented upon the fibre substrate. These sensor elements as indicated are presented upon the fibre substrate and therefore by appropriate positioning of the fibre substrates the directionality or an omnidirectional feature can be achieved for the sensor elements. It will be understood that the fibre substrates are utilised in order to present the sensor elements and therefore it is desirable that there is relative robustness in terms of location with the composite structure. This can be achieved by ensuring that the fibre substrates take the form of ribbons, sheets, tapes, corrugates, rib, stippled surfaces or tubes, pipes or rods which extend predictably within the structure particularly subsequent to curing. Initially, it may be understood that by associating the fibre substrates with other reinforcing fibres predictability with respect to presentation within the structure can be achieved. This predictability as indicated is by bundling the reinforcing fibres with the fibre substrates in order to achieve a more consistent position within the composite structure and therefore presentation and orientation of the sensor element associated with the fibre substrate.

As indicated whole component life monitoring is advantageous. In such circumstances monitoring during initial material lay-up for component formation, fibre positioning within the layout-up materials, mould closure, resin insertion, resin or filler setting, package shrinkage/chemical change extraction of the component from a mould, cladding, finishing and forming as well as transportation, product assembly with other components, whole assembly transportation, in operational use and ongoing repair and maintenance are all aspects of the component lifecycle. Each of these different stages necessitates varying levels of intensity of monitoring in order to achieve most efficient operation. For example, consistency of manufacture may require closer monitoring than subsequent individual component monitoring as a result of transportation. It will be understood that close monitoring during fabrication will enable identification of production problems and therefore prevent continuing manufacture of defective components until the production/fabrication problem is solved. Similarly during routine maintenance more detailed analysis of a component may identify particular problems with a certain installation and therefore allow consideration of improvement of manufacturing processes and component design. Other stages such as transportation may only require limited confirmatory monitoring of the component rather than in depth analysis in view of the reduced likelihood of significant alterations in the component structure.

As indicated on going monitoring of a component through its fabrication and operational life is advantageous. However, it is also necessary that such monitoring arrangements do not overly intrude upon component design in terms of weight or otherwise. In such circumstances generally light beam interrogation of sensor elements presented upon the fibre substrate is utilised. Thus, the sensor elements typically comprise mainly techniques utilising Bragg gratings, equalisation of wave lengths, polarisation self-modulation, Lamb waves and variations in reflections from coatings provided to the sensor elements presented upon the fibre substrate in accordance with aspects of the present invention. Such interrogation will be achieved through a controller which may act passively or actively or a combination. By passively it will be understood that the interrogation of the sensor element is provided either continuously or periodically in known sequence. In such circumstances a controller receives power from an external source and so monitoring is only provided when such power is presented. With respect to active monitoring, power can be provided from an internal source and sensing of response from the sensor elements triggered by internal or external means and generally electively in order to specifically acquire results. In a hybrid arrangement ongoing passive monitoring occurs, with analysis, then electively stimulated when required by a spurious or unexpected result for additional monitoring and determination, to avoid complicated continuous communications. A power storage device such as capacitor or battery may be utilised to ensure monitoring continues when no power is actively being transferred to the sensor controller. Generally, it is preferable that the control device incorporates a memory device in order to store response signals from the sensor elements until an appropriate download interrogation is required. In such circumstances trends within the component can be identified and utilised with respect to the life time calculations for the component. It will be appreciated with regard to components such as those used in gas turbine engines, engine rotation can provide power transfer mechanisms and therefore be used to trigger monitoring in accordance with monitoring arrangements defined by aspects of the present invention. It will also be understood that elective operation or monitoring can be initiated by an operative as required during repair or maintenance of the engine or other structures within which the component is provided.

As indicated above generally fibre substrates for composite elements in accordance with aspects of the present invention will be presented within the component at locations where required. In such circumstances a relatively large number of fibre substrates and therefore presented sensor elements can be provided within a component. Furthermore these components may all be assembled into a complex multi-component device such as with regard to blades within a gas turbine engine. Each individual component in the form of a blade or other structure may be individually interrogated and therefore typically a multiplexing process with regard to transfer of data is important. Furthermore, to avoid wiring and other complexities generally each component will incorporate as indicated a controller to analyse each sensor element presented upon a fibre substrate in accordance with aspects of the present invention. This controller will typically consolidate and store response signals from the sensor elements in a memory as a component history and then communicate these stored response signals when appropriately triggered, such as when requested by an operator of the assembly within which the component is provided or during manufacturing processes upon final testing or intermediate testing of the component prior to despatch or otherwise. Communication will generally be through a wireless process to avoid problems with regard to providing couplings or otherwise for data transfer. Further alternatives are communication by optic links or transmissions formed by the movement of the component being monitored.

The desired sensor element in accordance with aspects of the present invention will be interrogated to provide a response signal dependent upon environmental variations rather than a simple permanent change in the sensor element as a result of environmental variations. Examples of environmental variations are pH, temperature, pressure, acceleration, strain, rotational speed and position, tip wear/gap, integrity, incident light, twisting and moisture ingress. Examples of approaches with regard to provide sensor elements which can monitor these environmental changes are provided below by way of example.

pH can be measured in several ways. The most advantageous approach is through a sensitised coating upon a bare optical fibre, thus, by measuring attenuation in a light beam passing through the optical fibre a pH indicator is provided. Such an approach can be utilised during manufacture and repair of the component as an indicator of curing and otherwise with regard to the matrix whilst during in service operational use the optical fibre utilised for pH determination can provide structural strength and can be utilised to measure other parameters at different points along its length. An alternative approach to measuring pH may include use of a plastic fibre or section and providing an indicator (colour change) to variation of pH or presence of a substance to be measured and again through consideration of optical beam transmission attenuation or colour (frequency) change determination can be given with regard to pH or substance presence.

Temperature can be measured using a Bragg grating written onto an optical fibre. Such Bragg gratings act as an optical reflector and as temperature varies it will be understood that the grating spacing and consequently the wavelength of light reflected back from the grating varies. Bragg gratings offer one solution with regard to component monitoring but avoiding space problems with provision of a large number of independent thermometers. It will be understood that several gratings can be located along a single optical fibre at respective positions in order to provide temperature values at each of those positions. In such circumstances as the gratings are located at discrete points on the fibre temperature measurements can be made at these points and therefore through the predictability of the fibre substrate positions a temperature map of the component provided as required.

Pressure can be measured by a number of methods. Pressure changes with regard to the shape of the substrate fibre can be utilised using a type of Bragg grating formed as a set so as to compensate for temperature and other blade movements and vibration. Such Bragg gratings exploit the dual material nature of the fibre and are placed at angles across and around the fibre substrate and at spacings to suit the frequency of light to be used.

Acceleration of a component can be determined by measuring pressure on the faces of an inertial block provided within the component. An inertial gyro located within the controller and situated generally at a relatively stable position such as a root of a blade can be used to calculate differential acceleration where an impact or shock disturbs the component rather than through predicted driving of the component.

Strain upon a component can be measured again using Bragg gratings written onto an optical fibre. The gratings act as an optical reflector and as strain varies so does the grating spacing and consequently the wavelength of light reflected back from the grating. Generally in order to compensate for temperature variations two wavelengths of light are utilised as reflections from the Bragg grating and so compensation can be made for temperature variations as a measurement of strain.

Such measurements may also be made using Fabry-Perot interferometers.

Rotational speed and position can be determined through an autogyro or Hall Effect probe in order to give orientation, rotation speed and a once per rev pulse.

With a component such as a turbine blade it will be appreciated that it is desirable to measure tip wear and gap between an end of the component blade and an adjacent cowling. Measurement of change of fibre length can be utilised in order to determine by fibre expansion or contraction tip wear and gap changes. It will be appreciated that the component in contact with the cowling will be abraded and therefore the end of the fibre similarly abraded giving an indication of tip wear. Although in practice this may be difficult to achieve accurately as fibres are relatively hard and brittle such that they tend to fracture away from the tip rather than progressively abrade whilst fibres such as plastic fibres may be too soft so such debris from abrasion and liners can become embedded and pushed into the length of the fibre to erroneously alter the fibre length. A recessed fibre can provide line of sight measurement to the liner and thus an accurate measurement of tip gap when compared to a tip wear sensor but the recess can become blocked. An alternative approach is to provide a hollow fibre but in such circumstances it will again be necessary to provide centrifugal air flow or otherwise in order to keep the hollow fibre clean. Nevertheless, by use of a fibre substrate and an appropriate sensor element which may comprise abrasion of the fibre substrate itself it is possible to determine tip wear and gap changes such that by controlling the blade length it may be possible to alter the tip clearance without requiring abradable linings or tips.

With regard to component integrity it will be appreciated that the underlying fibre substrate provides an accessible monitor of integrity. By appropriate choice of fibre substrates it will be appreciated that the fibre substrate may be rendered brittle such that it will fracture when overly stressed. In such circumstances as described with regard to U.S. Pat. No. 3,910,105 a light beam presented along the optical fibre as a light pipe will be interrupted to give an indication of failure of component integrity. This failure will be presented as a warning of damage which can be noted. Furthermore, by appropriate positioning of the optical fibres damage which may be internal and therefore not externally visible can be identified and minute fractures of a number of fibre substrates collated to provide an indication of component failure or predictability of failure and therefore expected continuing life. It will be understood that generally some components will be subject to a constant stream of small impacts from dust particles, airborne grit and other elements including rain drops. These impacts provide vibrational forcing at a resident frequency on the blade. Such resident frequencies change with air speed, rotational speed, air pressure and integrity of structure. By use of fibre substrates and sensor elements in accordance with aspects of the present invention sensor responses can be provided through integrity determinations in order to shift gravitational speeds from the component away from resident frequencies which may damage the component. In such circumstances the controller in accordance with aspects of the present invention may be associated with engine control systems as indicated to adjust rotational speed to avoid damaging resonance points and also in order to potentially reduce noise generated by the engine.

Monitoring by incident light upon a component sensitive to such light or otherwise can again be achieved by providing an external coating to the component and then utilising the sensor elements associated with the fibre substrates to measure this coating. One approach to determining presence of the coating is simply through a sensor element within the fibre substrate monitoring incident light through the coating. However, alternatively and to provide greater analytical tools it is better to calculate the thickness of the coating. Such calculations of the thickness of the coating can be achieved through specific excitation using a laser and then determining the coating thickness by measuring a damping constant or echo timing through the fibre substrate/sensor element.

By strategically placing fibre substrates and sensor elements it is possible to measure strain and displacement by calculating component angle and therefore degree of twist or untwist at various points along the fibre substrate. Such twisting can be compared to previous modelling using standard comparison curves to determine blade chord, elasticity and other cycling during operational life of the component in order to detect fatigue damage.

In a similar manner to that with regard to pH and substance measurement ingress of moisture can be determined by varying a section of the fibre substrate such that the moisture presented upon the bare fibre substrate will adjust light attenuation in a fibre coating and therefore provide an indication of moisture ingress to the fibre substrate in the component.

As indicated above extracting data from the sensor utilised in accordance with aspects of the present invention will typically be achieved through wireless communication such as through radio frequencies, ultra high frequencies or very high frequency signals between a controller receiving response signals from the sensor element associated with the fibre substrate. Alternatively, where possible slip-rings, infrared or other optical links or flux transfer processes can be utilised in order to deliver indicator signals to an appropriate display.

In terms of display it will appreciated that a particular display necessary for condition may be dependent on component life stage. For example, aspects of the present invention may be altered to determine variations in component temperature to a reasonable accuracy but such accuracy may not be absolutely necessary and therefore a simple display of a temperature below a predetermined level may be acceptable or no display at all. Similarly with regard to manufacture monitoring of core temperature utilising fibre substrates and sensor elements in accordance with aspects of the present invention may simply be utilised to ensure that curing temperatures remain within safe limits or such that the curing temperature is varying within an acceptable rate and an indication provided accordingly. Furthermore, for the component history the control device and an associated memory device are utilised in order to store maximum core temperatures at particular locations within the component as part of the production records for that component. Furthermore, such information with regard to temperature as indicated can be presented absolutely or simply as a satisfactory or non satisfactory or no display value. In any event the stored values can be used to indicate if further testing of the component is required or that the component should be remade or the component specified as having a limited life.

Fibre substrates and associated sensor elements may be positioned upon the component to monitor external coating of the component during manufacture. These substrate fibres act as sensor elements using light at the tips of the fibres to monitor reflectance and ambient light to give an assessment of coating health. During manufacture these same fibres can utilise low power at different colours (frequencies) of light to act as indicators to operators of the manufacturing process. Patterns of display, different colours, strobing (flashing) can be used as conventional indicators to impart information with regard to coating, in terms of quality and health of the component.

It will also be understood by providing fibres towards the leading edge where cross blade pressure ratios are typically monitored in service similar techniques can be utilised as those described above with regard to surface monitoring and external coatings on the blade. Thus, by conjunction with rotation and position sensing and light pulsing within the optical fibres at correct timings it will be appreciated different display patterns, different colours and strobing within the fibres will be identifiable to the human eye and can be utilised in order to determine component operational state. It will also be understood that each component through its control element may be individually interrogated using typically an encrypted transceiver to identify each component and therefore obtain an appropriate display through light signals within the fibres or by responses stored in the controller and downloaded through the wireless link or otherwise as described above to the display device. In such circumstances colour changes within the optical fibre can be identified in the display. Furthermore, individual addressability for validation and confirmation of authenticity can be incorporated in a display in terms of an expected colour response as one part of the display or identify a signal or code.

Currently repair of integrated reinforcing fibres within a composite structure is difficult. The damaged area can be cut away and remanufactured but in order to maintain component monitoring in accordance with aspects of the present invention each relevant fibre must be aligned between the existing fibre substrate structure and the replacement.

Aspects of the present invention have particular applicability with regard to blades utilised in gas turbine engines. Logging and analysis of a variety of mechanical and electrical properties of any system can be performed in accordance with aspects of the present invention. The data is collected and monitored in order to determine the performance of the system and through comparative analysis predict system failures so that it can be serviced before system failure and to provide a 'remaining useful life' calculation for predictive maintenance and planning. By embedding fibre substrates within components the predicative response in terms of environmental variations as identified above can be consolidated in order to provide the remaining useful life calculation as indicated through an appropriate algorithm or empirical determination through prototype testing of the component.

The number of fibres required in order to achieve monitoring in accordance with an arrangement in accordance with aspects of the present invention is generally small but will be chosen to provide sufficient coverage to allow for redundancy and to allow for better diagnostics. Typically, a full weave of fibre substrates will be provided. In such circumstances each individual sensor element may be identifiable within the full weave of fibre substrates in order to electively determine which parts of the component are to be monitored. Normally continuous monitoring of all parts of the component in real time is not required. In such circumstances as indicated above either passively or actively or a combination of both will allow for particular or representative parts of the component to be monitored at appropriate times. Generally, there is insufficient space within a component to accommodate necessary electronics for interrogation and storage as well as power supply for the arrangement. Some components such as blades within a gas turbine engine may incorporate a hollow cavity within which at least some of the electronics can be stored but this is generally not ideal in view of the relative hostility of such environments. Nevertheless, generally both electronic and/or optical multiplexing is required to keep weight to a minimum and to reduce the parasitic effects on strength and space within a component.

By aspects of the present invention effectively during the manufacturing process a quality quotient can be achieved providing assurance with respect to quality, reliability and consistency between manufactured components. Such quality quotient can be determined through diagnostics for each of the sensor elements during various stages of the manufacturing process and particularly with those detected in the process which have the greatest variability. Measurement during component production can prevent a potentially faulty component from being processed any further reducing waste costs while at the same time indicating that there is a problem with regard to the manufacturing process which requires resolving before further potentially faulty components are manufactured.

With regard to in service or operational performance of a component it will be appreciated the sensor elements provide an indication of remaining useful life as a result of previous operational performance. These sensor elements will provide response signals to a controller which through an appropriate relational algorithm will determine the effects upon future operational life of a component such as that a series of seemingly insignificant events which collectively may limit the life of component can be flagged. Normal practice is to define a component life such that the component will not fail in normal service. In such circumstances perfectly good components are generally removed from service because there nominal life has been reached. By measuring and predicting remaining useful life through using sensor elements in accordance with aspects of the present invention individual component life quotients can be defined for a component such that avoiding failure of a component during operational service can still be achieved but that components life and safety margin adjusted dependent upon actual in service history.

Generally it is know to provide electronics in so called encased or potted format. A composite blade utilises resin as a binder with respect to the reinforcing fibres/fibres substrates in accordance with aspects of the present invention. In such circumstances areas of the component may incorporate a filler or spacer piece which is generally in the form of shaped carbon, resin block or resilient material. In accordance with aspects of the present invention the electronic elements of the control device along with measurement devices and analytical processors can be incorporated into these filler pieces within the composite component.

As indicated above generally fibre optic sensors are utilised in accordance with aspects of the present invention. In such circumstances these sensors provide a low weight and reduce necessary cables to the control device and so do not significantly add to overall weight of the component.

By the use of light beam interrogation it will be understood that arrangements in accordance with aspects of the present invention are generally immune from electromagnetic interference and grounding problems. The low thermal mass of the fibre (sensor) elements and cables reduce thermal expansion and associated distortion problems with regard to sensor operations. Low thermal and electrical conductivity of the sensor elements and cables reduces unwanted thermal and electrical currents through the sensors which again can affect operation. It is possible to achieve resolution and accuracy with low electrical noise levels using fibre optic sensors secured upon fibre substrates in accordance with aspects of the present invention. It will be understood that high frequency response levels enable unstable and transient events to be captured utilising sensor elements in accordance with aspects of the present invention. Generally fibre optic sensors are capable of operating under extreme environments with the potential to be made even more robust by appropriate protective mechanisms. Fibre optic sensors can be made at a very small size and therefore located appropriately within a component structure. By appropriate construction it will be appreciated that measurement at a multiple set of points within a component can be achieved for different parameters but as indicated with low additional weight and complexity within a component structure. It will be appreciated that the fibre substrates upon which sensor elements in accordance with aspects of the present invention are presented have the dual function of providing a chassis upon which the sensor element is located as well as reinforcement for the component when not required for such operation.

In addition to fibre optic sensors it would be appreciated that low current electrical sensors can also be used but such sensors are best deployed towards less extreme environments such as at a root of a blade component or at least with appropriate protection such as through metallic shields.

In addition to providing displays it will be appreciated that lighting arrangements in accordance with aspects of the present invention may be utilised for directional response to component conditions. For example, with regard to de-icing, appropriate component monitoring in accordance with aspects of the present invention may provide a response signal and indicator signal which can then be used directly to activate de-icing of a component when required. Furthermore, by appropriate continued monitoring during its transportation and assembly, stressing or other environmental changes upon the component can be identified and stored, as well as to provide indications to the transporter or assembler that the component is distressed and therefore continued operation interrupted or procedures adapted.

Components in accordance with aspects of the present invention would generally as indicated be stressed during their operational life. Such components include fan and compressor blades for gas turbine engines in which stressing and other environmental variations are expected. However, component monitoring according to aspects of the present invention may also be utilised with regard to static structures such as vanes which although not actively rotated or otherwise moved may also be stressed in service.

The fibre substrates for utilisation with regard to sensor elements act as a chassis for sensor elements and can be carbon fibre although other fibres can be used such as glass reinforcement fibres etc. By use of Sapphire fibres it will be appreciated that metal or metal alloy structures can also be monitored in that the Sapphire fibres will allow embedding of such fibres to withstand formation process temperatures of up to 750° C. and with operational monitoring at up to 700° C. Other components to which aspects of the present invention may be applied include with regard to racing vehicles where design optimisation of the components may be performed on a predictive failure basis. For instance with regard to motor racing it may be possible to construct a bespoke disposable lightweight engine block optimised for a particular race conditions, track and competition. The embedded instrumentation would give notice of exceeding limits and the prediction of failure that may permit replacement of critical parts in the race with minimum time penalties.

Aspects of the present invention relate to monitoring of relatively light weight structures such that if operational parameters are exceeded a "come home" command may be initiated to return the assembly within which the component is associated prior to failure and so avoid loss of the whole assembly due to component failure. For example with an aero gas turbine engine, the "come home" command would permit safe completion to the desired destination where suitable maintenance can then be performed.

Figure 2:
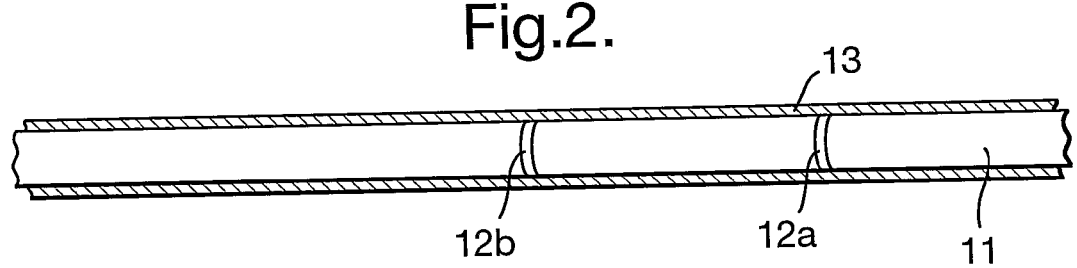
FIG. 2 is a schematic illustration of a second fibre substrate utilised in accordance with aspects of the present invention.

As indicated above generally Bragg gratings are useful with regard to providing sensor elements in accordance with aspects of the present invention. FIG. 1 and FIG. 2 illustrate potential example of gratings for utilisation in accordance with aspects of the present invention. In FIG. 1 a fibre substrate 1 is illustrated in which longitudinal gratings 2 are presented at various positions. In such circumstances by appropriate interrogation via a light beam presented towards the gratings 2 as indicated above various environmental conditions can be determined including temperature, stress, and pressure. Similarly with regard to FIG. 2 gratings 12 can be provided within a fibre substrate 11 at different positions such that an interrogating light beam presented to the gratings 12 will result in viewing at those positions indicative of temperature, pressure or other environmental conditions. It will also be appreciated that the fibre substrate 11 may be coated with a coating 13 which again as outlined above will be responsive to variations in pH, incident substance about the fibre substrate 11 or moisture level.

Figure 3:
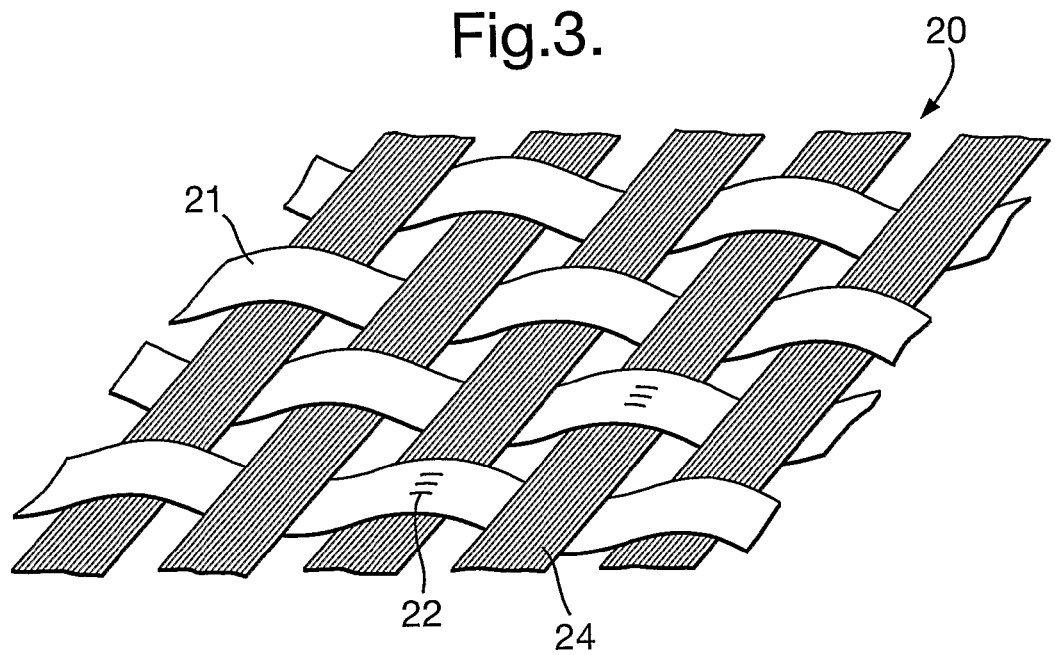
FIG. 3 is a schematic illustration of a weave integration of a fibre substrate in accordance with aspects of the present invention.

Relative positioning within a composite structure is important as indicated above in order to achieve location for sensory elements associated with the fibre substrate. As illustrated in FIG. 3 such relative positioning can be achieved through a weave of reinforcing fibres or tows 24 with fibre substrate fibres 21. In such circumstances a relatively stable weave is achieved so that gratings or other elements 22 positioned upon the fibre substrates 21 can be appropriately interrogated in order to provide response signals indicative of environmental conditions. It will be appreciated that the weave 20 will generally be incorporated within a composite structure with resin or other materials as a matrix for reinforcing a component in accordance with aspects of the present invention.

Figure 4:
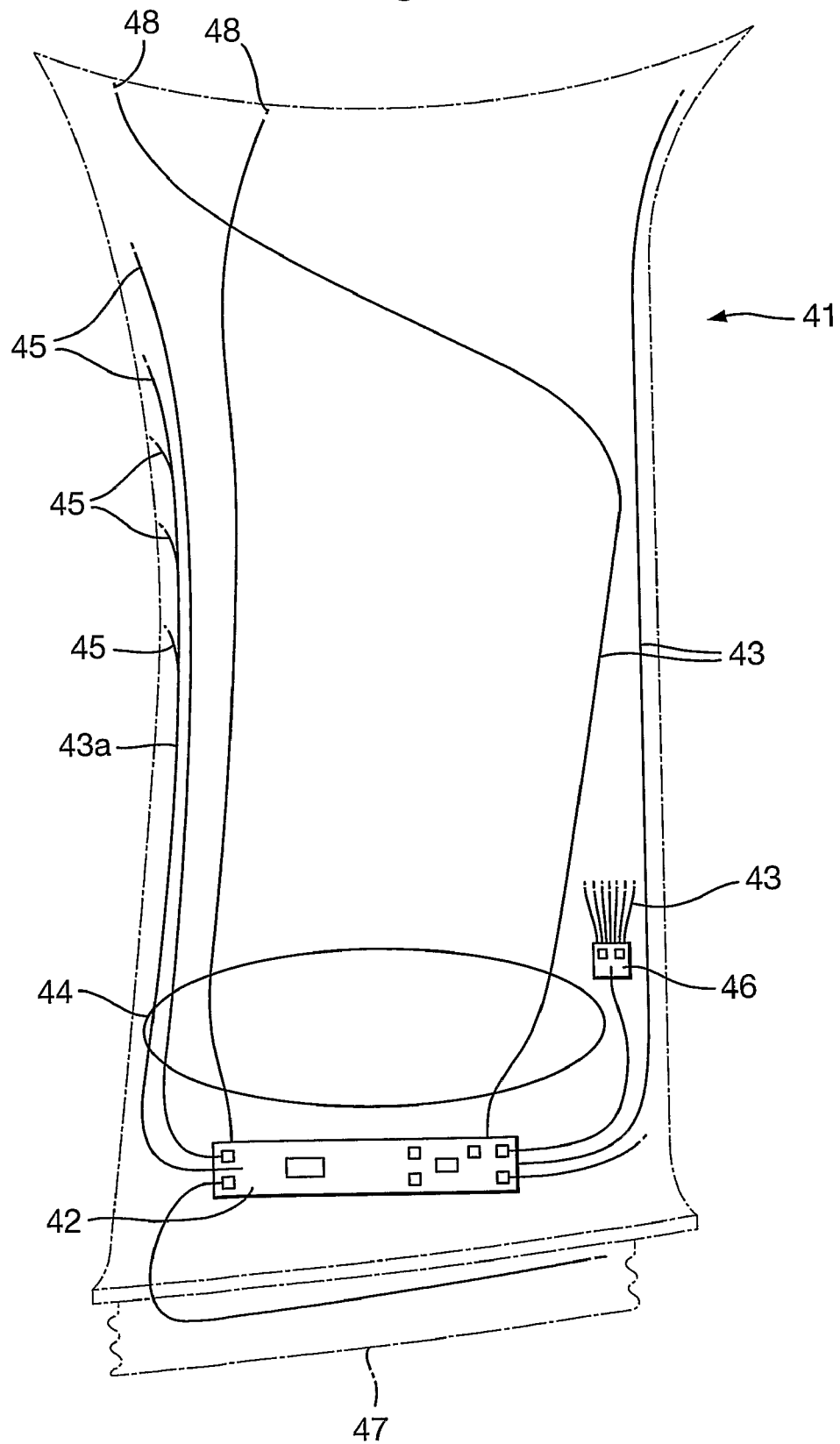
FIG. 4 is a schematic cross section of a component incorporating a component monitoring arrangement in accordance with aspects of the present invention; and, FIG. 5 is a schematic illustration of a general arrangement of a component in use in a gas turbine engine.

FIG. 4 provides schematic illustration of a component incorporating a component monitoring arrangement in accordance with aspects of the present invention. The example component is a blade 41 from a gas turbine engine. The blade 41 is generally hollow and so will accommodate an electronics pod 42 arranged to receive response signals from a plurality of sensor elements located and presented upon fibre substrates 43 located within the blade 41. The electronics pod 42 as indicated previously generally is passive or active or has a hybrid approach and so interrogates the sensor elements appropriately in order to receive the response signals from the sensor elements located upon the fibre substrates as well as transmits indicator signals through a transceiver located within the blade 41 for wireless transfer to a display device. A transceiver loop 44 will be appropriately positioned to enable as indicated wireless transmission of the indicator signals and will generally also allow power and data transfer within the component blade 41.

As can be seen the fibre substrates 43 illustrated are provided for in example only with some fibres extending to tips 48 to enable monitoring of the blade component at these locations. As indicated previously this may be through abrasion or otherwise. Seemingly, fibre substrates 43 may extend to a leading edge 45 to similarly allow monitoring along that edge 45. It will be understood in a practical component 41 a larger number of fibre substrates would generally be provided within the component 41 and sensor elements positioned along the fibre substrates in order to enable interrogation as described above for environmental variations at various locations in the component blade 41. In such circumstances typically a multiplexer device 46 will be positioned within the cavity of the blade component 41 with fibre substrates 43 extending from this multiplexer 46 along and within the blade component 41 such that the multiplexer 46 can interrogate the sensor element as well as receive by appropriate sequencing signals for transmissions to the electronics pod 42 for processing thereat.

As can be seen generally the component blade 41 in accordance with the example depicted in FIG. 4 will be secured through a root element 47 enabling the component 41 to be secured in use within the rotor disc of a gas turbine engine. It will be understood that the electronics pod could be also being located within this root 47.

Figure 5:
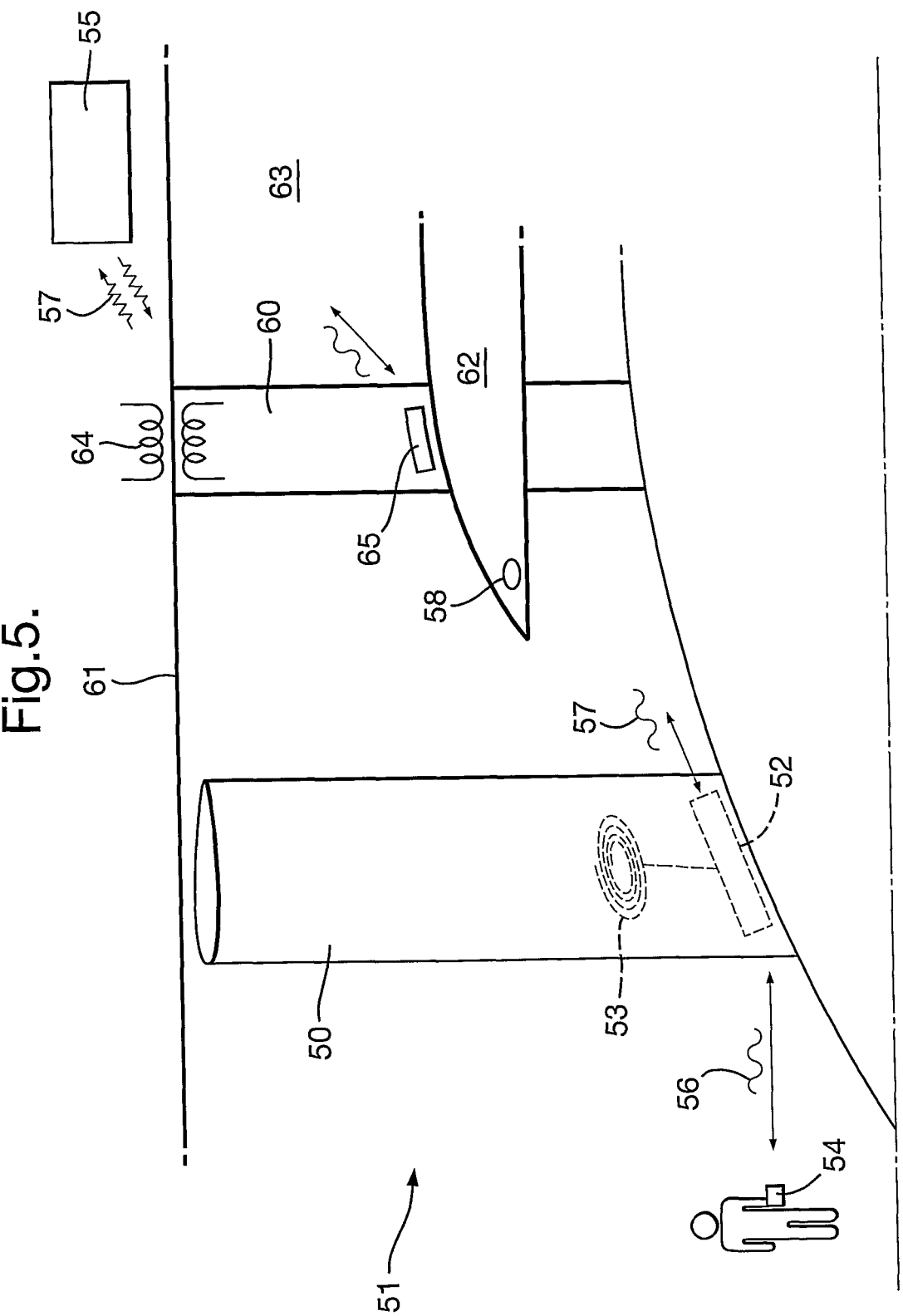

As indicated above aspects of the present invention have particular applicability with regard to monitoring of composite materials and components within gas turbine engines. FIG. 5 provides a schematic illustration of components 50, 60 utilised in a component monitoring arrangement in accordance with aspects of the present invention. As can be seen a component 50 comprises a blade or rotor within the engine arrangement 51. A number of components typically will be arranged to provide a blade assembly. As described previously the component 50 incorporates an electronics pod or controller 52 which is connected to a fibre substrate (not shown) in the component 50. A transceiver loop 53 is provided within the pod 52 to allow wireless radio frequency communications with either a hand held device 54 of a maintenance operative or an engine control or central control 55 through respective radio frequency links 56, 57. Power to the electronics pod 52 is typically achieved through electrical inductance transfer from a coil 58 in a stable part of the arrangement 51 and an inductance coil 53 in the component 50. In such circumstances, each pod 52 within a plurality of component 50 providing a blade assembly can be individually interrogated by the hand held device 54 or the control 55 to provide response signals indicative of the condition of each or some of the components 50.

Relatively stationary components such as stator vanes can be provided by a component 60 as depicted in FIG. 5. The component 60 may not rotate but can turn in terms of orientation and attitude to floor direction. This component 60 extends between a stable outer cowling surface 61 and an inner core 62. A space or gap between the cowling 61 and the core 62 defines a bypass path 63 through the arrangement 51. As the component 60 is stable it will be appreciated that through a simple coil 64 inductance of electrical power can be provided in order to provide electrical power to an electronics pod 65 associated with the component 60. This arrangement allows maintenance and replacement of stator 60 if necessary without need to have a fixed electrical connection. (Connectors are a cause of electrical and signal failure.) Alternatively, an electrical wire can be directly associated with the pod 65 through the component 60 as one of the reinforcing fibres. In such circumstances, as previously the pod 65 will be associated with fibre paths within the component 60. These fibre paths will incorporate sensors which can be interrogated by the electronics of the pod 65 in order to emit through wireless connections to a controller 55 or a hand device 54 indications as conditions of the component 60 in operational use and possibly provide a stored history for the component. In the same way, stator 70 may be provided with similar aspects of this invention as stator 60.

In the above circumstance it will be appreciated that as an alternative to interrogating the components 50, 60, 70 in actual operational use it may be more convenient to store measurement signals from the sensors provided upon the fibre substrate in the components 50, 60, 70 in a local memory device in the respective electronics pods 52, 65. In such circumstances the processed signals when stored provide a component history for the components 50, 60, 70 as a result of the sensor determined measurement values from the fibre substrate embedded within the component 50, 60, 70. This component history may enable a prediction of future performance and life for the respective components 50, 60. Predictions of future performance and life will enable programmed maintenance and repair to be performed with regard to components 50, 60 which may be liable to fail in service. It will also be appreciated that an on-going service and repair history can be associated with the respective memories in the electronics pods 52, 65 to enable a complete history of that component to be stored and associated with the component 50, 60 throughout its operational life.

Typically, as indicated there will be at least one controller 55 which may transmit data to and receive data from the electronic processing elements in the respective electronics pods 52, 65. The transmitted data may be utilised in control regimes or simply in order to provide an ongoing display of operational condition within the component. For convenience, generally most connections will be through wireless radio frequency connections with respect to the controllers and the embedded electronic pods receiving data from the fibre substrates.

As indicated above a particular advantage with regard to aspects of the present invention is that the embedded fibre substrates and therefore sensor elements in order to provide the indication as to environmental variations are located within the component during fabrication as well as during operational life. In such circumstances status in terms of transients as well as long term environmental variations across the component can be identified, stored and compared for trends and analysis as appropriate.

As indicated above a component in accordance with aspects of the present invention generally incorporates a sensor element structure or distribution. This sensor element structure provides response signals to be stored by a memory device. This memory device in such circumstances defines a component history comprising the response signals stored as results for different pre-determined stages of component manufacture or operation or simply time periods. In such circumstances the memory can be interrogated in order to provide a history with regard to a particular component. The component history can be compared with expected histories for the component in order to provide an indication of expected operational life or how much longer the component will be acceptable for providing its performance criteria. It will be understood that there are variables with regard to the component in terms of its manufacture and in particular with regard to operational incidents such as impacts, over temperature scenarios and usage. These environmental variations will all effect the operational life of a component. By providing a sensor element in accordance with aspects of the present invention a specific operational life of a component can be defined and identified. It will be understood as indicated above generally prior components have been specified with regard to a standard acceptable operational life for the component. This standard life will be determined upon analytical testing of prototype and sample component in terms of their life expectancy and a necessary margin of error with regard to ensuring good operational performance. By aspects of the present invention by using sensor elements the particular conditions for the component are identified and therefore an indication of operational life provided. Thus, at servicing or maintenance stages components can be replaced more appropriately. Furthermore, subsequent to an incident such as an impact components can be interrogated to determine damage and/or accumulation of problems which may collectively alter component life.

It will also be understood that a component in accordance with aspects of the present invention within a component assembly may be adjacent to or near other components which suffer life altering incidents. Such incidents include impacts and temperature cycling. A particular component may not itself be subject to such incidents but nevertheless these events may have an effect upon its operational life. In such circumstances further in accordance with aspects of the present invention components in an assembly adjacent to each other may be associated whereby memories in the respective components can store response signals from adjacent components to be added to their own sensor element responses in the component history in order to provide an indication as to operational life.

Modifications and alterations to aspects of the present invention will be listed by those skilled in the art. For example, fibre substrates as indicated in accordance with aspects of the present invention may be associated with reinforcing fibres within the component. In such circumstances the fibre substrates with the associated sensor elements may be particularly provided for one phase of the component life. Thus for example fibre substrates with associated sensor elements may be provided for monitoring during initial curing and fabrication of the component whilst these fibres are ignored or rendered redundant for monitoring purposes once that phase is completed. Nevertheless, these fibre substrates will still provide reinforcement within the component whilst other fibre substrates and associated sensor elements provide ongoing analysis and monitoring with respect to operational stages of a component's life.

The invention claimed is:

1. A component monitoring arrangement for a fibre-reinforced composite component, the component comprising a fibre substrate incorporating a sensor element, the fibre substrate being configured or orientated in use within the component to expose the sensor element to environmental variations incident upon or to the component and the sensor element being responsive to such environmental variations, the arrangement including a memory coupled to the sensor element to receive response signals, the memory integrally associated with the component, the memory storing the response signal to provide a component history.

2. An arrangement as claimed in claim 1 wherein the memory stores the response signals for a pre-determined fabrication stage and/or time period of operation for the component, the component history configured for comparison with a specified component history to provide an indication of expected operational life.

3. An arrangement as claimed in claim 1 wherein the sensor element comprises a coating upon the fibre substrate.

4. An arrangement as claimed in claim 3 wherein the coating on the fibre substrate is arranged to provide a response to variations in pH or moisture presented to the sensor element.

5. An arrangement as claimed in claim 1 wherein the sensor element comprises a Bragg grating in order to determine through configuration and deformity of the components substrate pressure, temperature, acceleration, strain, rotational speed, fibre substrate position angular position, tip gap, tip timing or integrity within the component.

6. An arrangement as claimed in claim 1 wherein the sensor element is interrogated by a light beam made up of one or more frequencies of light to provide a response signal shifted dependent upon the environmental variation.

7. An arrangement as claimed in claim 1 wherein the sensor element is associated with a controller.

8. An arrangement as claimed in claim 7 wherein the response signal is sent to the controller by wireless link.

9. An arrangement as claimed in claim 7 wherein the controller is arranged to actively interrogate the sensor element periodically or specifically.

10. An arrangement as claimed in claim 7 wherein the controller has a memory device for storing response signals.

11. An arrangement as claimed in claim 10 wherein the memory device is arranged to allow periodic determination of response signals of the sensor element over a desired time period.

12. An arrangement as claimed in claim 10 wherein the memory device is pre-programmed with component details and identification such as part and serial numbers.

13. A component incorporating a component monitoring arrangement as claimed in claim 1.

14. An assembly of components as claimed in claim 13 wherein each component includes a signal transmission path with adjacent components whereby at least some response signals from adjacent components are stored in at least one memory.

* * * * *